United States Patent Office 3,305,579
Patented Feb. 21, 1967

1

2

3,305,579

PRODUCTION OF CYCLOHEXENE-(3) CARBOXYLIC ACIDS AND THEIR ESTERS

Robert Stadler and Friedrich Becke, Heidelberg, and Hans Pirzer, Frankenthal, Pfalz, Germany, assignors to Anilin- & Soda-Fabrik Aktiengesellschaft, Ludwigshafen (Rhine), Germany No Drawing. Filed Oct. 12, 1962, Ser. No. 230,271
Claims priority, application Germany, Oct. 17, 1961, B 64,405
7 Claims. (Cl. 260—468)

This invention relates to a new process for the production of cyclohexene-(3) carboxylic acids and their esters. The invention further relates to novel cyclohexene-(3) carboxylic acid esters.

It is known that cyclohexene-(3) carboxylic acids or their esters are obtained when 1,3-dienes and acrylic acid or acrylic acid esters are reacted in a Diels-Alder reaction. It is also known that acrylic acid and its esters can be obtained from acetylene, carbon monoxide and water or an alcohol in the presence of a nickel catalyst. In the Diels-Alder reaction of butadiene-(1,3)—hereinafter referred to as butadiene—with dienophilic compounds, the yields are unsatisfactory because vinylcyclohexene-(3) is formed in preponderant amount by dimerization of the butadiene (cf. for example Liebigs "Annalen der Chemine," 543, (1940), p. 1 et seq., especially p. 22).

In another prior art process for the production of cyclohexene-(3) carboxylic acids or their esters, butadiene is reacted with an $\alpha,\beta$-unsaturated carbonyl compound, such as acrolein, according to Diels-Alder and the cyclohexene-(3)-aldehyde obtained is oxidized to the carboxylic acid, which may then be esterified. This method thus requires a plurality of stages. Furthermore the esterification of cyclohexene-(3) carboxylic acids with polyhydric alcohols or phenols proceeds unsatisfactorily.

It is an object of the present invention to provide a process according to which cyclohexene-(3) carboxylic acids or their esters may be prepared in a single-stage reaction from 1,3-dienes, $\alpha$-acetylene compounds, carbon monoxide and water and/or alcohols or phenols. Another object of the invention is to provide a process by which cyclohexene-(3) carboxylic acids or their esters are obtained in good yields. Yet another object of the invention is to provide a process by which the formation of dimers of 1,3-dienes as an undersirable side reaction is practically completely suppressed. A further object of the invention is novel cyclohexene-(3) carboxylic acid esters. Other objects of the invention will become apparent from the following description.

In accordance with this invention the said objects and advantages are achieved by reacting a 1,3-diene, an $\alpha$-acetylene compound, carbon monoxide and water and/or an alcohol or phenol at elevated temperature and under increased pressure in the presence of a nickel catalyst.

In the new process, the production of the acrylic compound from an $\alpha$-acetylene compound, carbon monoxide and a compound containing a hydroxyl group is combined into one process step with the adding-on of this acrylic compound to a 1,3-diene. In some cases the cyclohexene-(3) carboxylic acids or their esters are obtained in very good yields, although it is known that compounds having olefinic double linkages, such as ethylene, are readily converted with carbon monoxide and water in the presence of nickel catalysts under conditions similar to the reaction conditions of the process according to this invention into saturated carboxylic acids (in the case of ethylene into propionic acid). The above-mentioned dimerization of the 1,3-dienes hardly takes place at all. Surprisingly, the reaction rate in the new process is considerably higher than in the prior art production of acrylic acid and acrylic acid esters. The proportion of polymers formed as undesirable byproducts is also noticeably less than in the prior art method for the production of acrylic acid or acrylic acid esters. Many substances have become accessible in a satisfactory way only by the process according to this invention; examples of these are cyclohexene-(3)-carboxylic acid esters of polyhydric alcohols or phenols, such as the diesters of hydroquinone or triesters of glycerol.

The preferred 1,3-dienes are hydrocarbons having four to ten carbon atoms. If they are linear, a reaction product is obtained having a six-membered ring. Cyclic 1,3-dienes give compounds having bicyclic ring systems. Those cyclic 1,3-dienes having five to six ring members are preferred. Examples of suitable 1,3-dienes are: butadiene, isoprene, piperylene, 2,3-dimethylbutadiene, hexadiene-(2,4), octatriene-(1,3,6), 3-methylheptatriene-(1,4,6), cyclopentadiene and cyclohexadiene-(1,3). Other suitable 1,3-dienes having the said number of carbon atoms contain as inert groups or atoms one or two chlorine atoms or alkoxy groups having one to four carbon atoms, a carboxyl group or an esterified carboxyl group having two to five carbon atoms. Examples of such 1,3-dienes are: chloroprene, 2-methoxybutadiene, muconic acid, methyl muconate and butyl muconate.

Suitable $\alpha$-acetylene compounds, besides acetylene itself, are particularly acetylenes substituted by a hydrocarbon radical having one to seven carbon atoms. Individual examples are: methylacetylene, octyne-(1), phenylacetylene and p-tolylacetylene. The compound having 1,3-diene structure and the $\alpha$-acetylene compound are advantageously used in about molar amounts.

If it is desired to obtain cyclohexene-(3) carboxylic acids, the reaction is carried out in the presence of water. If, however, it is desired to obtain the esters of cyclohexene-(3) carboxylic acids, the reaction is carried out in the presence of an alcohol or a phenol. In the production of esters, the presence of water is also sometimes favorable, but in this case the amount of alcohol or phenol should predominate. The following are given as examples of suitable alcohols and phenols: methanol, ethanol, isopropanol, 2-ethylhexanol-(1), octanol-(2), lauryl alcohol, stearyl alcohol, allyl alcohol, crotyl alcohol, oleyl alcohol, cyclohexanol, cyclododecano, geranio, borneo, benzyl alcohol, $\beta$-phenylethyl alcohol, ethylene glycol monomethyl ether, ethylene glycol monobutyl ether, ethylene glycol, hexanediol-(1,6), octanediol-(1,8), glycerol, butanetriol-(1,2,4), pentaerythritol, phenol, the cresols and xylenols, resorcinol, hydroquinone, 1,4-dihydroxy-anthraquinone, 4-chlorophenol and 2,4,6-trichlorophenol. Preferred aliphatic alcohols contain up to twenty carbon atoms and one to four hydroxyl groups and, apart from the hydroxyl groups, exhibit hydrocarbon character or contain additionally one to two alkoxy groups having one to four carbon atoms. Preferred cycloaliphatic alcohols are cycloalkanols having six to twelve carbon atoms, whereas among the araliphatic alcohols those are preferred which have seven to twelve carbon atoms and, apart from the hydroxyl groups, contain only carbon and hydrogen. Preferred phenols contain six to fifteen carbon atoms, one to three hydroxyl groups and also exhibit hydrocarbon structure, excluding the hydroxyl groups, or are substituted by one to three chlorine atoms.

When polyhydric alcohols or phenols are to be reacted, the reaction can be directed, by suitable choice of the relative proportions, so that alcohols or phenols esterified one or more times are obtained as the main product. If monohydric alcohols or phenols which are liquid at room temperature are reacted or polyhydric alcohols or phenols esterified only once are to be prepared, it is advantageous to use the hydroxyl compound in excess and to carry on the reaction until the proportion of the reaction product in the reaction mixture is about 50 to 70% by weight. The excess of alcohol or phenol then acts at the same time as a solvent.

The coemployment of an inert solvent is particularly to be recommended when it is desired to react a hydroxyl compound which is solid at room temperature or to react polyhydric alcohols or phenols completely. The coemployment of an inert solvent is, however, also possible when starting from a liquid alcohol or phenol or when cyclohexene-(3) carboxylic acids are to be prepared, i.e., when working in an aqueous medium. Suitable inert solvents are for example tetrahydrofuran, dioxane, benzene and n-heptane.

The process according to this invention is carried out in the presence of a nickel catalyst. The nature of the catalyst is not exactly known. It is formed, however, from nickel or nickel compounds under the conditions of the process. The starting material used is nickel metal, preferably in finely divided form, or advantageously nickel compounds the nature of which is not critical. Suitable nickel compounds are for example salts, such as nickel sulfate, nickel nitrate, nickel phosphate, nickel carbonate, nickel cyanide, nickel acetate, nickel formate, nickel benzoate, nickel adipate and particularly nickel chloride, nickel bromide and nickel iodide. Other suitable nickel compounds are chelate complexes of divalent nickel, such as nickel acetylacetonate, nickel dimethylglyoxime, nickel benzoylacetonate and nickel salicylate. Other suitable nickel compounds are for example nickel oxide, nickel sulfide, nickel tetracarbonyl, nickel-bis-acrylonitrile, nickel-bis-acrolein, bis-triphenyl phosphine nickel dicarbonyl, bis-triethyl phosphite nickel dicarbonyl, triphenyl phosphite nickel tricarbonyl, nickel bromide triphenyl phosphine alkyl bromide complex compounds, nickel-bis-cyclooctadiene-(1,5), bis-tri-o-tolylphosphite nickel acrylonitrile.

It is also possible to use mixtures of different nickel compounds, e.g., nickel bromide and nickel acetylacetonate. The nickel compounds are usually employed in amounts of 0.05 to 1% by weight, based on the alcohol or phenol. When using a nickel compound it is preferable to add it in the form of a solution, for example, in water, methanol, or tetrahydrofuran.

The reaction speed and the yield are considerably increased when catalysts are used which also contain copper. Here again the starting material may be either the free metal or its compounds. The nature of the compound is again not critical. Rather all copper compounds give the desired effect under the reaction conditions. For example, copper salts, such as cupric sulfate, cupric nitrate, cupric carbonate, cupric phosphate, cupric chloride, cupric iodide, cupric bromide, cuprous chloride, cuprous iodide, cupric formate, cupric acetate, cupric benzoate, and cuprous nitrate may be added. Chelate complexes of copper, such as copper acetyl acetonate, are also suitable. Furthermore, copper compounds which are not salt-like, such as cuprous oxide, cupric oxide and cupric sulfide, may also be used. Particularly effective catalysts are obtained by adding a copper halide, particularly cuprous iodide, to the reaction mixture. The copper or copper compound is advantageously used in amounts of 10 to 50% by weight with reference to the nickel or nickel compound.

It is recommendable to use a catalyst which contains halogen in free or combined form. In this case also the yield and reaction rate are increased. It is advantageous to start from a nickel halide and/or a copper halide (when copper is included). A further addition of halogen or a halogen compound is not then necessary but is advantageous in some cases. When the nickel compound, and any copper compound used, does not contain halogen, it is possible to add hydrogen halides, alkyl halides, aryl halides, organic or inorganic acid halides and/or elementary halogen. Examples of suitable additions, which are advantageously used in amounts of 0.01 to 0.1% by weight with reference to the total reaction mixture, are hydrogen chloride, hydrogen bromide, hydrogen iodide, sodium fluoride, sodium chloride, sodium bromide, potassium iodide, ammonium bromide, cryolite, zinc iodide, methyl iodide, ethyl chloride, tetrafluoroethylene, iodobenzene, bromobenzene, 2,4,6-tribromophenol, octyl chloride, benzoyl chloride, thionyl chloride, sulfuryl bromide and the free halogens.

It is moreover recommendable to add to the reaction mixture a small amount, for example, 1 to 5% by weight, with reference to the alcohol or phenol, of an organic acid. Thus for example the $\alpha,\beta$-unsaturated acid derived from the $\alpha$-acetylene to be reacted, or the cyclohexene-(3) carboxylic acid may be used. It is also possible however to coemploy other carboxylic acids. In this case it is best to use fatty acids having one to six carbon atoms, alkane diacids having two to twelve carbon atoms or aromatic carboxylic acids having one or two aromatic rings and the same number of carboxyl groups. The following are examples of suitable acids: formic acid, acetic acid, caproic acid, oxalic acid, adipic acid, dodecane diacid-(1,12), benzoic acid, isophthalic acid and 2-naphthoic acid. It should be emphasized, however, that all other organic acids are suitable, such as chloroacetic acid, p-nitrocinnamic acid, o-chlorobenzoic acid, cyclohexanecarboxylic acid, phenylacetic acid, lactic acid, glyoxylic acid and nicotinic acid. Adding acid produces improved results especially when working in the absence of water. It is less important when preparing free cyclohexene-(3) carboxylic acids or when working in the presence of water, for example with 90% alcohol, in the production of esters as already described. In these cases the $\alpha,\beta$-unsaturated carboxylic acid corresponding to the acetylene compound or the diene adduct thereof with the 1,3-diene is formed in situ. Even then however it is sometimes recommendable to add a carboxylic acid to the reaction mixture.

The process according to this invention is advantageously carried out at a temperature between 150° and 250° C., preferably between 170° and 215° C. The reaction may be carried out at atmospheric pressure but it is advantageous to work at increased pressure. This is usually more than 10 atmospheres and often more than 20 atmospheres and its upper limit is determined by the known safety provisions such as apply for the use of readily decomposable $\alpha$-acetylene compounds. For example if acetylene itself is to be reacted, its partial pressure should not exceed 30 atmospheres and the total pressure should not exceed 300 atmospheres.

The process may be carried out for example by heating the 1,3-diene, the $\alpha$-acetylene compound, water and/or the alcohol or the phenol, the substances which form the catalysts and if desired the solvent in the presence of carbon monoxide. It is surprising that the acrylic compounds formed intermediately should have very little tendency to polymerize. As an additional safety feature it is however possible to add one of the conventional polymerization inhibitors, such as thiodiphenylamine, or hydroquinone, in a small amount, for example 0.01% by weight with reference to the whole of the initial mixture.

It is more advantageous to mix only the water and/or alcohol or phenol, the substances forming the catalyst and the solvent, when used, to heat this mixture to the reaction temperature and then to supply simultaneously the 1,3-diene, the α-acetylene compound and carbon monoxide. It is also possible to add at first only a portion of the α-acetylene compound and carbon monoxide and then to introduce the 1,3-diene into the reaction mixture at the same time as the remainder of the α-acetylene compound and the remainder of the carbon monoxide. The process may readily be made continuous for example by continuously introducing the hydroxyl compound containing the 1,3-diene dissolved therein, the substances forming the catalyst and also appropriate amounts of carbon monoxide and acetylene compound into the reaction vessel and at the same time withdrawing an equivalent amount of reaction mixture. The reaction mixture is worked up in the usual way, advantageously by distillation.

The substances which can be prepared by the new process are valuable intermediates for further reactions, for example for the production of plasticizers. Cyclohexene-(3) carboxylic acid esters of higher alcohols or phenols and especially of polyhydric alcohols or phenols may also be used direct as plasticizers. Suitable novel reaction products for use as plasticizers have the general formula:

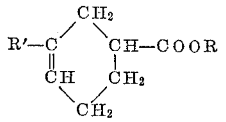

(I)

in which R denotes an aliphatic hydrocarbon radical having eight to twenty carbon atoms, a cycloalkyl radical having six to twelve carbon atoms, an aralkyl radical having seven to fifteen carbon atoms or an aryl radical having six to ten carbon atoms and with or without one to three chlorine atoms. In the Formula I, R′ stands for hydrogen, chlorine or methoxy. Compounds of this type include: the hexyl ester, 2-ethylhexyl ester, lauryl ester, stearyl ester, oleyl ester, cyclohexyl ester, cyclooctyl ester, cyclododecyl ester, benzyl ester, β-phenylethyl ester, phenyl ester, α-naphthyl ester, 2-chlorophenyl ester and 2,4,6-trichlorophenyl ester of cyclohexene-(3) carboxylic acid, 3-chlorocyclohexene-(3) carboxylic acid n-butyl ester, and 3-methoxycyclohexene-(3) carboxylic acid n-butyl ester. The novel substances are suitable, inter alia, as plasticizers for nitrile rubber (butadiene-acrylonitrile copolymers). They are incorporated in amounts of 10 to 30% by weight into the nitrile rubber in a roll mill in the way conventional for the production of plasticized plastics.

In other novel compounds of the Formula I, R may denote an alkoxyalkyl radical having three to six carbon atoms. Compounds of this type are for example the β-methoxyethyl ester, β-ethoxyethyl ester and β-n-butoxyethyl ester of cyclohexene-(3) carboxylic acid. They may be converted into the said cyclohexene-(3) carboxylic acid esters suitable as plasticizers by exchange of ester radicals with higher alcohol. For example the components may be heated in the presence of 1% by weight of sulfuric acid to a temperature at which the more readily volatile alkoxy alkanol distills off.

The following examples illustrate, but do not limit, the present invention. Unless otherwise specified, the parts given in the following examples are parts by weight; they have the same relation to parts by volume as the gram to the cc.

*Example 1*

1960 parts by volume of tetrahydrofurane, 268 parts by volume of water, 20 parts of acrylic acid, 4 parts of nickel bromide, 0.4 part of cuprous iodide, 1 part of hydrogen bromide and 2 parts of hydroquinone are introduced into a pressure vessel consisting of corrosion-resistant steel and provided with stirring means. The pressure vessel is flushed with nitrogen and 25 atmospheres of a gas mixture consisting of equal parts of acetylene and carbon monoxide is forced in. The pressure vessel is then heated and the pressure increased to 60 atmospheres by forcing in more of the gas mixture. At 200° C., liquid butadiene is forced in in addition to the gas mixture. The temperature is kept at 200° C. for forty minutes. Up to this point, 600 parts of butadiene and 530,000 parts by volume of gas mixture (with reference to room temperature and atmospheric pressure) have been forced into the pressure vessel.

The reaction mixture is cooled; 3380 parts of reaction mixture having the density 0.966 is obtained. This contains: 50 parts of acrylic acid and 1204 parts of cyclohexene-(3) carboxylic acid having the boiling point 120° C. at 8 mm. Hg, the density 1.083 and the refractive index $n_D^{20}=1.4800$. The yield of cyclohexene-(3) carboxylic acid is 86% of the theory with reference to butadiene supplied.

*Example 2*

2300 parts by volume of tetrahydrofurane, 320 parts by volume of water, 5 parts of nickel acetylacetonate, 2 parts of nickel bromide, 0.4 part of cuprous iodide, 20 parts of acetic acid and 2 parts of thiodiphenylamine are introduced into the pressure vessel used in Example 1. The further procedure of Example 1 is followed, but the supply of cyclopentadiene is begun at 180° C. Vigorous reaction sets in at 190° C. so that the temperature temporarily rises to 205° C. 790 parts of cyclopentadiene and 600,000 parts by volume (S.T.P.) of gas mixture are supplied within 1¾ hours.

3830 parts by volume of reaction mixture having the density 0.994 are obtained. 1482 parts of endomethylenecyclohexene-(3) carboxylic acid can be recovered therefrom by distillation. The yield is 90% of the theory with reference to the cyclopentadiene supplied.

*Example 3*

The procedure of Example 1 is followed but starting from 1800 parts by volume of methanol, 85 parts of water, 85 parts of acrylic acid, 4 parts of nickel propionate, 2 parts of nickel bromide, 0.4 part of cuprous iodide and 2 parts of thiodiphenylamine. Reaction sets in at 195° C. 650 parts (S.T.P.) of butadiene and 650,000 parts by volume (S.T.P.) of gas mixture are introduced in the course of 1½ hours.

3200 parts by volume of reaction mixture having the density 0.930 is obtained. About 10 parts of acrylic acid, 22 parts of methyl acrylate, 117 parts of cyclohexene-(3) carboxylic acid and 1470 parts of cyclohexene-(3) carboxylic acid methyl ester are recovered from the reaction mixture by distillation. The yield of the two last-mentioned products is 91% of the theory with reference to butadiene supplied.

*Example 4*

A pressure vessel is charged with 1800 parts by volume of methanol, 85 parts of water, 85 parts of acrylic acid, 4 parts of nickel propionate, 2 parts of nickel bromide, 0.4 part of cuprous iodide and 2 parts of thiodiphenylamine, the pressure vessel is flushed with nitrogen and then 25 atmospheres of a mixture of equal parts of acetylene and carbon monoxide is forced in. The mixture is heated and further gas mixture is forced in. The supply of cyclopentadiene is begun at 180° C. and a vigorous reaction sets in at 190° C. The pressure is kept between 50 and 62 atmospheres by continuous supply of cyclopentadiene and the said gas mixture. In the course of one hour there are supplied in this way 790 parts of cyclopentadiene and such an amount of the gas mixture that the total amount thereof is 600,000 parts by volume (S.T.P.). The temperature during the reaction is between 180° and 195° C.

3300 parts by volume of a reaction mixture having the density 0.966 is obtained; it contains 10 parts of acrylic acid, 84 parts of methyl acrylate, 30 parts of endomethylenecyclohexene-(3) carboxylic acid and 940 parts of endomethylenecyclohexene-(3) carboxylic acid methyl ester. The yield of the two last-mentioned compounds is 52% of the theory with reference to cyclopentadiene supplied.

*Example 5*

The initial materials are 1830 parts by volume of ethyl alcohol, 85 parts by volume of water, 85 parts of acrylic acid, 5 parts of nickel bromide, 0.2 part of cuprous iodide and 1 part of thiodiphenylamine. The procedure of Example 4 is followed, the pressure being raised to 58 atmospheres at 180° C. by forcing in the gas mixture and the supply of liquid butadiene being commenced at the same time. A vigorous reaction commences at 190° C. The temperature after an hour is 195° C. and 650 parts of butadiene and a total of about 700,000 parts by volume of the gas mixture have been supplied.

3250 parts by volume of reaction mixture having the density 0.928 is obtained; it contains 20 parts of acrylic acid, 205 parts of ethyl acrylate, 225 parts of cyclohexene-(3) carboxylic acid and 1380 parts of cyclohexene-(3) carboxylic acid ethyl ester. The yield of the two last-mentioned compounds is 89% of the theory with reference to butadiene supplied.

*Example 6*

The pressure vessel is charged with 1830 parts by volume of ethyl alcohol, 85 parts by volume of water, 85 parts of acrylic acid, 5 parts of nickel bromide, 0.2 part of cuprous iodide and 1 part of hydroquinone, flushed with nitrogen and then 25 atmospheres of the gas mixture forced in. The whole is heated and the pressure is increased to 55 atmospheres by supplying further gas mixture. Supply of isoprene is begun at 180° C. The pressure is kept between 50 and 60 atmospheres by supplying further gas mixture. The reaction temperature is between 180° and 190° C. 725 parts of isoprene is introduced within one hour. The total amount of gas mixture supplied to the reaction vessel is 700,000 parts by volume.

3440 parts by volume of reaction mixture having the density 0.919 is obtained; it contains 35 parts of acrylic acid, 200 parts of ethyl acrylate, 100 parts of methylcyclohexene-(3) carboxylic acid and 1550 parts of methylcyclohexene-(3) carboxylic acid ethyl ester. The yield of the two last-mentioned substances is 93% of the theory with reference to isoprene supplied.

*Example 7*

The pressure vessel is charged with 1830 parts by volume of ethyl alcohol, 85 parts by volume of water, 85 parts by volume of acrylic acid, 5 parts of nickel bromide, 0.2 part of cuprous iodide and 1 part of hydroquinone, flushed with nitrogen and then 25 atmospheres of the gas mixture is forced in. The mixture is heated to 180° C. and the pressure then increased to 60 atmospheres by forcing in more of the gas mixture, the supply of cyclopentadiene being commenced at the same time. A vigorous reaction sets in at 185° C. and is kept in progress by supplying cyclopentadiene and more of the gas mixture. 770 parts of cyclopentadiene and a total amount of 750,000 parts by volume (S.T.P.) of gas mixture are supplied in this way within one hour. The temperature at the end of the reaction is 190° C.

3420 parts by volume of reaction mixture is obtained containing 34 parts of acrylic acid, 215 parts of ethyl acrylate, 212 parts of endomethylenecyclohexane-(3) carboxylic acid and 1480 parts of endomethylenecyclohexene-(3) carboxylic acid ethyl ester. The yield of the two last-mentioned products is 90% of the theory with reference to cyclopentadiene supplied.

*Example 8*

1800 parts by volume of isobutanol, 75 parts by volume of water, 130 parts of cyclohexene-(3) carboxylic acid, 4 parts of nickel bromide, 0.2 part of cuprous iodide and 2 parts of thiodiphenylamine are charged into the pressure vessel and heated. The pressure begins to decrease at 185° C. Liquid butadiene is then supplied and the pressure kept at between 50 and 60 atmospheres by forcing in more of the gas mixture. A total of 590 parts of butadiene and 550,000 parts by volume (S.T.P.) of the gas mixture are supplied within one hour. The reaction temperature is between 185° and 195° C.

3170 parts by volume of reaction mixture having the density 0.917 is obtained containing 52 parts of acrylic acid, 122 parts of isobutyl acrylate, 70 parts of cyclohexene-(3) carboxylic acid, 1880 parts of cyclohexene-(3) carboxylic acid isobutyl ester and 60 parts of distillation residue. Taking into account the 130 parts of cyclohexene-(3) carboxylic acid added, the yield of cyclohexene-(3) carboxylic acid and its isobutyl ester is 96% of the theory with reference to the butadiene supplied.

*Example 9*

The pressure vessel is charged with 1300 parts by volume of tetrahydrofuran, 50 parts by volume of water, 620 parts of ethylene glycol, 126 parts of cyclohexene-(3) carboxylic acid, 5 parts of nickel acetylacetonate, 2 parts of nickel bromide, 0.4 part of cuprous iodide and 1 part of thiodiphenylamine. It is flushed with nitrogen and 25 atmospheres of gas mixture is forced in; heating up of the mixture is then begun. Vigorous reaction commences at 187° C. and a pressure of 60 atmospheres. Liquid butadiene and gas mixture are forced in continuously. The reaction is ended after 1½ hours during which 930 parts of butadiene and 850,000 parts by volume (S.T.P.) of gas mixture have been supplied.

3980 parts by volume of a clear greenish liquid is obtained which contains 38.5 parts of acrylic acid, 76 parts of cyclohexene-(3) carboxylic acid, 259 parts of ethylene glycol cyclohexene-(3) carboxylic acid monoester and 2063 parts of ethylene glycol cyclohexene-(3) carboxylic acid diester. The yield of the two last-mentioned products is 98.5% of the theory with reference to butadiene.

*Example 10*

The pressure vessel is charged with 1500 parts by volume of tetrahydrofuran, 80 parts by volume of water, 940 parts of phenol, 126 parts of cyclohexene-(3) carboxylic acid, 5 parts of nickel acetylacetonate, 2 parts of nickel bromide, 0.4 part of cuprous iodide and 2 parts of thiodiphenylamine. It is flushed with nitrogen, 25 atmospheres of the gas mixture is forced in and heating of the mixture is begun. At 190° C. and 60 atmospheres, marked decrease in pressure occurs which is compensated for by forcing in gas mixture and by supplying liquid butadiene at the same time. 470,000 parts by volume (S.T.P.) of the gas mixture and 500 parts of butadiene are used up within 1½ hours.

3580 parts by volume of reaction mixture is obtained containing 62 parts of acrylic acid, 214 parts of cyclohexene-(3) carboxylic acid, 1381 parts of cyclohexene-(3) carboxylic acid phenyl ester, 30 parts of vinylcyclohexene and 110 parts of distillation residue. Taking into account the cyclohexene-(3) carboxylic acid added at the beginning, the yield of cyclohexene-(3) carboxylic acid and its phenyl ester is 81% with reference to butadiene added.

*Example 11*

The pressure vessel is charged with 1300 parts by volume of tetrahydrofuran, 50 parts of water, 720 parts of butanediol-(1,4), 72 parts of acrylic acid, 5 parts of nickel acetylacetonate, 2 parts of nickel bromide, 0.4 part of cuprous iodide and 1 part of thiodiphenylamine. The pressure vessel is flushed with nitrogen. 25 atmospheres of a gas mixture consisting of equal parts of acetylene and carbon monoxide is forced in and the mixture heated. At 180° C. the pressure is increased to 60 atmospheres by the supply of more of the gas mixture and the supply of liquid butadiene is begun at the same time. A vigorous reaction sets in at 182° C. The temperature is kept at 187° to 197° C. for seventy minutes by the supply of more mixed gas and butadiene. 780,000 parts by volume (S.T.P.) of mixed gas and 890 parts of butadiene are used up in all.

3660 parts by volume of a light brownish liquid having the density 1.013 is obtained from which 80 parts of acrylic acid, 200 parts of cyclohexene-(3) carboxylic acid, 90 parts of butanediol-(1,4) cyclohexene-(3) carboxylic acid monoester and 2000 parts of butanediol-(1,4) cyclohexene-(3) carboxylic acid diester are obtained by distillation. The yield of the three last-mentioned products is thus more than 90% of the theory with reference to butadiene supplied.

*Example 12*

550 parts of hydroquinone, 1300 parts by volume of tetrahydrofuran, 50 parts by volume of water, 72 parts of acrylic acid, 5 parts of nickel acetylacetonate, 2 parts of nickel bromide, 0.4 part of cuprous iodide and 0.5 part of thiodiphenylamine are charged into a pressure vessel of corrosion-resistant steel. The pressure vessel is flushed with nitrogen. Then 30 atmospheres of a gas mixture consisting of equal parts of acetylene and carbon monoxide is forced in. The mixture is heated and more of the gas mixture is forced in so that the pressure is 61 atmospheres at 186° C. At this temperature, the supply of liquid butadiene to the pressure vessel is begun in addition to more of the gas mixture. The reaction which commences is so strongly exothermic that it is no longer necessary to heat the pressure vessel but on the contrary it must be cooled by a stream of air. Such an amount of the gas mixture is supplied within 2½ hours that the total amount is 561,000 parts by volume (at room temperature and atmospheric pressure). A total of 600 parts of butadiene is supplied. The temperature varies between 193° and 205° C.

The reaction mixture is allowed to cool to 0° C. and the crystal slurry is filtered off by suction. 1290 parts of white crystals is obtained consisting of practically pure hydroquinone cyclohexene-(3) carboxylic acid diester. The melting point of the product is 103° C. and the boiling point 250° C. at 3 mm. Hg.

The filtrate contains 38 parts of acrylic acid, 244 parts of cyclohexene-(3) carboxylic acid and 199 parts of a residue of higher boiling point. The yield of cyclohexenecarboxylic acid and its ester is 90% of the theory with reference to the butadiene supplied.

*Example 13*

The pressure vessel is charged with 460 parts of glycerol, 1300 parts by volume of tetrahydrofuran, 160 parts by volume of methanol, 30 parts by volume of water, 8 parts of nickel acetylacetonate, 2 parts of nickel bromide, 0.6 part of cuprous iodide, 126 parts of cyclohexene-(3) carboxylic acid and 1 part of thiodiphenylamine. The pressure vessel is flushed with nitrogen and 30 atmospheres of a gas mixture consisting of equal parts of acetylene and carbon monoxide is forced in. The mixture is heated while stirring and more of the gas mixture is forced in at the same time so that the pressure at 187° C. is 61 atmospheres. The simultaneous supply of liquid butadiene is then begun. Within 2½ hours, 1050 parts of butadiene and such an amount of the gas mixture are supplied that the total amount of the latter is 1,012,000 parts by volume (S.T.P.). The temperature is between 190° and 206° C.

The reaction mixture is allowed to cool and 4080 parts by volume of greenish yellow liquid reaction product is obtained containing 15 parts of acrylic acid, 325 parts of cyclohexene-(3) carboxylic acid, 540 parts of cyclohexene-(3) carboxylic acid methyl ester, 154 parts of glycerol cyclohexene-(3) carboxylic acid diester and 1850 parts of glycerol cyclohexene-(3) carboxylic acid triester. The components of the mixture may be recovered by fractional distillation. The yield of cyclohexene-(3) carboxylic acid and its esters is 85% of the theory with reference to butadiene supplied.

*Example 14*

1830 parts by volume of ethyl alcohol, 85 parts by volume of water, 126 parts of cyclohexene-(3) carboxylic acid, 5 parts of nickel acetylacetonate, 0.3 part of cupric acetate, 3 parts of zinc bromide and 1 part of hydroquinone are charged into a pressure vessel of corrosion-resistant steel. The pressure vessel is flushed with nitrogen and 30 atmospheres of a gas mixture consisting of equal parts by volume of acetylene and carbon monoxide is forced in. The pressure vessel is heated. When the temperature has reached 190° C., the pressure is raised to 60 atmospheres by forcing in more of the gas mixture. At the same time, the supply of liquid butadiene is begun. The reaction starts with the development of much heat. The pressure vessel is cooled by blowing air onto it so that the temperature is kept between 165° and 190° C. In this way 350,000 parts by volume (S.T.P.) of the gas mixture and 350 parts of butadiene are gradually supplied. The supply of butadiene is then stopped and another 300,000 parts by volume of the gas mixture is forced into the pressure vessel within thirty minutes. The temperature during this period is kept at 161° to 189° C.

When the supply of the gas mixture has been completed, another 350 parts of butadiene is introduced into the reaction vessel and the temperature kept at 188° to 190° C. The pressure in the reaction vessel falls from 61 to 39 atmospheres during the supply of butadiene.

3455 parts by volume of a pale yellow clear liquid containing no sediment is removed from the cooled reaction vessel which has been released from pressure. The liquid consists of 38.5 parts of acrylic acid, 108 parts of cyclohexene-(3) carboxylic acid, 204 parts of ethyl acrylate, 1765 parts of cyclohexene-(3) carboxylic acid ethyl ester and 73 parts of distillation residue. The yield of cyclohexene-(3) carboxylic acid and its ethyl ester, taking into account the cyclohexene-(3) carboxylic acid added at the start, is 88% of the theory with reference to the butadiene supplied.

*Examples 15 to 50*

The procedure of Example 9 is followed in Examples 15 to 33, 44, 49 and 50, the procedure of Example 3 is followed in Examples 34, 35, 42 and 43, the procedure of Example 1 is followed in Examples 36 to 40 and 45 to 48 and the procedure of Example 12 is followed in Example 41, but the reaction conditions are varied. The gas mixture used in each case is a mixture of equal parts of acetylene and carbon monoxide. The reaction conditions and the results are given in the following tables:

TABLE

| Example | Parts of nickel compound | Parts of copper compound | Parts of water | Parts of alcohol |
|---|---|---|---|---|
| 15 | 5 nickel acetylacetonate, 2 $NiBr_2$ | 0.4 CuI | 50 | 1,300 n-octyl alcohol. |
| 16 | do | 0.4 CuI | 50 | 1,440 n-nonyl alcohol. |
| 17 | do | 0.4 CuI | 50 | 1,580 decyl alcohol. |
| 18 | do | 0.4 CuI | 50 | 930 n-dodecyl alcohol. |
| 19 | do | 0.4 CuI | 50 | 1,500 cetyl alcohol. |
| 20 | do | 0.4 CuI | 50 | 1,070 stearyl alcohol. |
| 21 | do | 0.4 CuI | 50 | 870 allyl alcohol. |
| 22 | do | 0.4 CuI | 50 | 1,300 ethylhexyl alcohol. |
| 23 | 4 $NiBr_2$ | | 75 | 975 β-phenylethyl alcohol. |
| 24 | 4 $NiBr_2$ | | 80 | 1,000 cyclohexyl alcohol. |
| 25 | 4 $NiBr_2$ | | 70 | 1,024 cyclooctyl alcohol. |
| 26 | 4 $NiBr_2$ | 0.8 $CuBr_2$ | 75 | 1,365 cyclododecyl alcohol. |
| 27 | 5 nickel acetylacetonate, 2 $NiBr_2$ | 0.4 CuI | 50 | 620 ethylene glycol. |
| 28 | do | 0.4 CuI | 70 | 760 1,3-propylene glycol. |
| 29 | do | 0.5 CuI | 60 | 832 neopentyl glycol. |
| 30 | do | 0.4 CuI | 50 | 670 1,1,1-trimethylolpropan . |
| 31 | do | 0.4 CuI | 50 | 1,292 glycol monomethyl ether. |
| 32 | do | 0.3 CuI | 50 | 1,350 glycol monoethyl ether. |
| 33 | 4 nickel acetylacetonate, 2 $NiBr_2$ | 0.4 CuI | 50 | 1,416 glycol monobutyl ether. |
| 34 | 4 $NiBr_2$ | | 75 | 1,800 n-butyl alcohol. |
| 35 | 0.8 $NiSO_4$ | | 4 | 80 n-butyl alcohol. |
| 36 | 0.8 $NiBr_2$ (0.8 part cryolite added) | 0.1 Cu metal | 4 | |
| 37 | 0.8 $NiNO_3$ | 0.2 $CuSO_4$ | 4 | |
| 38 | 0.8 $NiBr_2$ | 0.1 Cu metal | 4 | |
| 39 | 0.8 $NiBr_2$ | 0.15 CuI | 10 | |
| 40 | 0.8 $NiBr_2$ | 0.15 CuI | 10 | |
| 41 | 6 nickel acetylacetonate, 2 $NiBr_2$ | 0.6 CuI | 40 | 790 2,4,5-trichlorophenol. |
| 42 | 3 $Ni(CO)_4$ | 0.4 CuI | 40 | 1,800 n-butyl alcohol. |
| 43 | 4 bis-acrylonitrile nickel | 0.4 CuI | 80 | 2,100 n-butyl alcohol. |
| 44 | 5 bis-tri-o-tolylphosphite nickel acrylonitrile | 0.4 CuI | 50 | 720 butanediol-(1,4). |
| 45 | 0.8 NiO | 0.15 CuI | 10 | |
| 46 | 0.8 NiS | 0.15 CuI | 10 | |
| 47 | 4 $Ni(NO_3)_2$ (0.8 part iodine added) | 0.8 $CuSO_4$ | 250 | |
| 48 | 4 $NiBr_2$ | 0.8 CuI | 250 | |
| 49 | 2 $NiBr_2$, 5 nickel acetylacetonate | 0.4 CuI | 50 | 740 n-butyl alcohol. |
| 50 | 3 $NiBr_2$, 3 nickel acetylacetonate | 0.4 CuI | 75 | 750 n-butyl alcohol. |

| Example | Parts of butadiene | Parts by vol. of gas mixture or atm. | Parts of acid | Parts by volume of solvent | Parts of stabilizer |
|---|---|---|---|---|---|
| 15 | 540 | $540.10^3$ | 126 cyclohexene-(3) carboxylic acid | 400 tetrahydrofuran | 2 thiodiphenylamine. |
| 16 | 550 | $510.10^3$ | do | do | Do. |
| 17 | 340 | $505.10^3$ | do | 500 tetrahydrofuran | 1.5 thiodiphenylamine. |
| 18 | 275 | $250.10^3$ | do | 800 tetrahydrofuran | 2 thiodiphenylamine. |
| 19 | 340 | $319.10^3$ | do | 1,000 tetrahydrofuran | Do. |
| 20 | 220 | $206.10^3$ | do | 2,260 tetrahydrofuran | Do. |
| 21 | 1,250 | $414.10^3$ | do | 700 tetrahydrofuran | Do. |
| 22 | 540 | $500.10^3$ | 126 acrylic acid | 500 benzene | Do. |
| 23 | 450 | $409.10^3$ | 126 cyclohexene-(3) carboxylic acid | 800 tetrahydrofuran | 1.5 thiodiphenylamine. |
| 24 | 510 | $474.10^3$ | 100 acetic acid | do | 2 thiodiphenylamine. |
| 25 | 440 | $404.10^3$ | 120 acrylic acid | 800 dioxane | Do. |
| 26 | 410 | $376.10^3$ | 126 cyclohexene-(3) carboxylic acid | 1,100 tetrahydrofuran | 1.5 thiodiphenylamine. |
| 27 | 1,025 | $945.10^2$ | do | 1,300 tetrahydrofuran | 2 thiodiphenylamine. |
| 28 | 1,050 | $973.10^3$ | 150 acrylic acid | 1,150 dioxane | Do. |
| 29 | 875 | $810.10^3$ | 130 cyclohexene-(3) carboxylic acid | 1,300 tetrahydrofuran | Do. |
| 30 | 740 | $688.10^3$ | 125 cyclohexene-(3) carboxylic acid | 1,500 tetrahydrofuran | Do. |
| 31 | 920 | $854.10^3$ | 126 cyclohexene-(3) carboxylic acid | 400 tetrahydrofuran | Do. |
| 32 | 810 | $758.10^3$ | do | 500 tetrahydrofuran | Do. |
| 33 | 650 | $602.10^3$ | 120 acrylic acid | do | Do. |
| 34 | 860 | $796.10^3$ | 126 cyclohexene-(3) carboxylic acid | | 1.5 thiodiphenylamine. |
| 35 | 15 | 145 atm | 4 acrylic acid | | 0.1 thiodiphenylamine. |
| 36 | 20 | 168 atm | 5 cyclohexene-(3) carboxylic acid | 70 tetrahydrofuran | Do. |
| 37 | 20 | 150 atm | 4 formic acid | 70 dioxane | Do. |
| 38 | 20 | 150 atm | 4 chloroacetic acid | 70 tetrahydrofuran | Do. |
| 39 | 20 | 143 atm | 1 hydrogen bromide | 70 dimethylformamide | Do. |
| 40 | 20 | 120 atm | do | 70 acetone | Do. |
| 41 | 300 | $265.10^3$ | 140 cyclohexene-(3) carboxylic acid | 1,400 tetrahydrofuran | 2 thiodiphenylamine |
| 42 | 850 | $780.10^3$ | 126 cyclohexene-(3) carboxylic acid | | 1 thiodiphenylamine. |
| 43 | 830 | $772.10^3$ | do | | 1.5 thiodiphenylamine. |
| 44 | 760 | $706.10^3$ | do | 1,300 tetrahydrofuran | 2 thiodiphenylamine. |
| 45 | 20 | 208 atm | 1 hydrogen bromide | 70 tetrahydrofuran | 0.1 thiodiphenylamine. |
| 46 | 20 | 172 atm | do | do | Do. |
| 47 | 750 | $693.10^3$ | 20 cyclohexene-(3) carboxylic acid | 1,940 dioxane | 2 hydroquinone. |
| 48 | [a] 570 | $320.10^3$ | 40 cyclohexene-(3) carboxylic acid | 2,000 tetrahydrofuran | 1.5 thiodiphenylamine. |
| 49 | [b] 620 | $357.10^3$ | 126 cyclohexene-(3) carboxylic acid | 1,000 tetrahydrofuran | 2 thiodiphenylamine. |
| 50 | [c] 870 | $482.10^3$ | do | 100 tetrahydrofuran | 1 thiodiphenylamine. |

| Example | Temp., ° C. | Pressure (atm.) | Parts of cyclohexene-(3) carboxylic acid ester | Boiling point | $n_D^{30}$ | Yield of ester (percent of the theory with ref. to 1,3-diene) |
|---|---|---|---|---|---|---|
| 15 | 195 | 60 | 1,787 n-octyl ester | 151° C./7 mm | 1.4586 | 75 |
| 16 | 200 | 60 | 2,346 n-nonyl ester | 182° C./24 mm | 1.4635 | 93 |
| 17 | 210 | 60 | 2,365 n-decyl ester | 167° C./9 mm | 1.4602 | 89 |
| 18 | 195 | 60 | 1,265 n-dodecyl ester | 221° C./20 mm | 1.4580 | 86 |
| 19 | 198 | 60 | 1,738 cetyl ester | 245° C./12 mm | 1.4590 | 79 |
| 20 | 190 | 60 | 1,042 stearyl ester | 275° C./15 mm | 1.4618 | 70 |
| 21 | 220 | 60 | 204 allyl ester | 70°-75° C./2 mm | 1.4672 | 13.4 |
| 22 | 195 | 60 | 1,982 2-ethylhexyl ester | 130° C./4 mm | 1.4579 | 83 |
| 23 | 196 | 60 | 1,462 β-phenylethyl ester | 175° C./11 mm | 1.5183 | 76 |
| 24 | 195 | 60 | 1,434 cyclohexyl ester | 144° C./14 mm | 1.4786 | 73 |

TABLE—Continued

| Example | Temp., ° C. | Pressure (atm.) | Parts of cyclohexene-(3) carboxylic acid ester | Boiling point | $n_D^{30}$ | Yield of ester (percent of the theory with ref. to 1,3-diene) |
|---|---|---|---|---|---|---|
| 25 | 200 | 60 | 814 cyclooctyl ester | 166° C./9 mm | 1.4857 | 42.3 |
| 26 | 200 | 60 | 1,114 cyclododecyl ester | 158° C./3 mm | 1.4920 | 51.5 |
| | | | | | $n_D^{20}$ | |
| 27 | 180–190 | 60 | 1,839 ethylene glycol diester | 184° C./4 mm | 1.4925 | 70.0 |
| | | | 375 ethylene glycol monoester | 135° C./8.5 mm | 1.4811 | 11.6 |
| 28 | 200 | 60 | 2,133 propylene glycol diester | 158° C./3 mm | 1.4875 | 75.4 |
| | | | 241 propylene glycol monoester | | | 6.7 |
| 29 | 200 | 60 | 1,785 neopentyl glycol diester | 197° C./5 mm | 1.4870 | 70 |
| | | | 104 neopentyl glycol monoester | 173° C./19 mm | 1.4686 | 3.1 |
| | | | | | $n_D^{30}$ | |
| 30 | 200 | 60 | 1,016 trimethylolpropane triester | 268° C./5 mm | 1.4970 | 49 |
| | | | 220 trimethylolpropane diester | | | 9 |
| | | | 14 trimethylolpropane monoester | | | 0.5 |
| 31 | 198 | 60 | 2,643 glycol monomethyl ether ester | 111° C./9 mm | 1.4580 | 85 |
| 32 | 200 | 60 | 2,488 glycol monoethyl ether ester | 130° C./14 mm | 1.4548 | 84 |
| 33 | 195 | 60 | 2,330 glycol monobutyl ether ester | 180° C./40 mm | 1.4555 | 86 |
| | | | | | $n_D^{20}$ | |
| 34 | 195 | 60 | 2,317 n-butyl ester | 122° C./21 mm | 1.4568 | 80 |
| 35 | 205 | 60 | 3 n-butyl ester | 122° C./21 mm | | 2.9 |
| 36 | 200 | 60 | | | | |
| 37 | 200 | 60 | | | | |
| 38 | 200 | 60 | | | | |
| 39 | 200 | 60 | | | | |
| 40 | 200 | 60 | | | | |
| 41 | 205 | 60 | 1,080 2,4,5-trichlorophenyl ester | 168° C./2 mm., M.P. 52° C. | | 64 |
| 42 | 200 | 60 | 2,520 n-butyl ester | 122° C./21 mm | 1.4568 | 88 |
| 43 | 200 | 60 | 2,720 n-butyl ester | 122° C./21 mm | 1.4568 | 96 |
| 44 | 205 | 60 | 1,300 butanediol-(1,4) diester | 208° C./3 mm | 1.4905 | 61 |
| | | | 190 butanediol-(1,4) monoester | 153° C./3 mm | | 6.8 |
| 45 | 205 | 60 | | | | |
| 46 | 205 | 60 | | | | |
| 47 | 200 | 60 | | | | |
| 48 | 198 | 60 | | | | |
| 49 | 190 | 60 | 849 3-chlorocyclohexene-(3) carboxylic acid n-butyl ester | 140° C./12 mm | 1.4747 | 56 |
| | | | | | $n_D^{30}$ | |
| 50 | 198 | 60 | 976 5-(α-methylpropenyl)-cyclohexene-(3) carboxylic acid-(1) n-butyl ester. | 99° C./5 mm | 1.4762 | 52 |

| Example | Parts of cyclohexene-(3) carboxylic acid | Yield of acid (percent of the theory with ref. to 1,3-diene) | Yield of acid and ester (percent of the theory with ref. to 1,3-diene) | Example | Parts of cyclohexene-(3) carboxylic acid | Yield of acid (percent of the theory with ref. to 1,3-diene) | Yield of acid and ester (percent of the theory with ref. to 1,3-diene) |
|---|---|---|---|---|---|---|---|
| 15 | 73 | 5.8 | 80.8 | 33 | 186 | 12.3 | 98.3 |
| 16 | 75 | 5.9 | 98.5 | 34 | 93 | 4.6 | 84.6 |
| 17 | 79 | 6.8 | 95.8 | 35 | | | 2.9 |
| 18 | 58.3 | 9.2 | 95.2 | 36 | 20 | 42 | 42 |
| 19 | 171.2 | 21.0 | 100.0 | 37 | 12 | 25 | 25 |
| 20 | 57 | 11.3 | 81.3 | 38 | 12 | 25 | 25 |
| 21 | | | | 39 | 17.8 | 38 | 38 |
| 22 | 76 | 6 | 89 | 40 | 4 | 8.5 | 8.5 |
| 23 | 134 | 12.8 | 88.8 | 41 | 167 | 24 | 88 |
| 24 | 183 | 15.4 | 88.4 | 42 | 160 | 8 | 96 |
| 25 | 157 | 15 | 57.3 | 43 | 78 | 4 | 100 |
| 26 | 121 | 13 | 64.5 | 44 | 394 | 22.2 | 90 |
| 27 | 176 | 7.4 | 89 | 45 | 13 | 28 | 28 |
| 28 | 169 | 6.9 | 89 | 46 | 17.3 | 37 | 37 |
| 29 | 166 | 8.2 | 81.3 | 47 | 1,710 | 97 | 97 |
| 30 | 145 | 8.4 | 66.9 | 48 | [d] 895 | 86 | 86 |
| 31 | 58 | 2.7 | 87.2 | 49 | [d] 110 | 10 | 66 |
| 32 | 105 | 5.5 | 89.5 | 50 | | | 52 |

[a] Chloroprene[2-chlorobutadiene-(1,3)]. [b] Chloroprene. [c] 3-methylheptatriene-(1,4,6). [d] 3-chlorocyclohexene-(3) carboxylic acid.

We claim:

1. A process for the production of compounds selected from the group consisting of cyclohexene-(3) carboxylic acids and their esters which comprises reacting a 1,3-diene having 4–10 carbon atoms, 0–2 chlorine atoms, 0–2 alkoxy groups of 1–4 carbons atoms, 0–1 carboxyl groups, 0–1 carboxyl ester groups with 2–5 carbons, and otherwise a hydrocarbon structure, an α-acetylene compound having a hydrocarbon structure and 2–9 carbon atoms, carbon monoxide and at least one member selected from the group consisting of water, alcohols having 1–4 hydroxyl groups, 1–20 carbon atoms, 0–2 alkoxy groups with 1–4 carbon atoms, and otherwise a hydrocarbon structure and phenols having 6–15 carbon atoms, 1–3 hydroxyl groups on the aryl ring, 0–3 chlorine atoms, and otherwise the hydrocarbon structure, at a temperature between 150° C. and 250° C. at a pressure above 10 atmospheres and below the decomposition pressure of the α-acetylene compound employed in the presence of a nickel catalyst formed under the reaction conditions.

2. A process as claimed in claim 1 wherein halogen is also a component of the catalyst for said reaction.

3. A process as claimed in claim 1 wherein copper is also a component of the catalyst for said reaction.

4. A process as claimed in claim 1 wherein the reaction is carried out in the presence of an organic carboxylic acid.

5. A process as claimed in claim 1 wherein the 1,3-diene is butadiene.

6. A process as claimed in claim 1 wherein the acetylene compound is acetylene.

7. A process as claimed in claim 1 wherein the reaction is carried out at a temperature between 170° and 215° C.

(References on following page)

References Cited by the Examiner

UNITED STATES PATENTS

| | | | |
|---|---|---|---|
| 2,441,183 | 5/1948 | Bludworth et al. | 260—468 |
| 2,698,339 | 12/1954 | Hawkins et al. | 260—468 |
| 3,048,628 | 8/1962 | Lynn et al. | 260—468 X |
| 3,060,227 | 10/1962 | Stadler et al. | 260—486 |
| 3,088,967 | 5/1963 | Pare | 260—468 X |

OTHER REFERENCES

Almasi et al., "Chem. Abstracts," vol. 55, p. 19427*f* (1961).

Nazarov et al., "Chem. Abstracts," vol. 54, p. 8714*e* (1960).

Bird, "Chemical Reviews," (1962), pp. 283–302 (pages 283 and 286 relied on).

Bird, "Chem. Rev.," vol. 62 (1962), pp. 296–298.

Booth, "Chem. Soc. London (Proceeding)" (1961).

LORRAINE A. WEINBERGER, *Primary Examiner.*

LEON ZITVER, *Examiner.*

R. K. JACKSON, *Assistant Examiner.*